United States Patent
Vivanco et al.

(10) Patent No.: US 9,503,948 B1
(45) Date of Patent: Nov. 22, 2016

(54) MANAGING DATA REDUNDANCY OF WIRELESS DEVICE COMMUNICATION

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 92 days.

(21) Appl. No.: 14/196,984

(22) Filed: Mar. 4, 2014

(51) Int. Cl.
*H04W 36/08* (2009.01)
*H04W 28/08* (2009.01)
*H04W 72/02* (2009.01)
*H04W 24/00* (2009.01)

(52) U.S. Cl.
CPC .............. *H04W 36/08* (2013.01); *H04W 28/08* (2013.01); *H04W 24/00* (2013.01); *H04W 72/02* (2013.01)

(58) Field of Classification Search
None
See application file for complete search history.

(56) References Cited

U.S. PATENT DOCUMENTS

| 8,040,836 | B2 | 10/2011 | Wu et al. |
| 8,130,776 | B1 | 3/2012 | Sundararajan et al. |
| 2002/0137518 | A1* | 9/2002 | Achour ............... 455/447 |
| 2005/0190745 | A1* | 9/2005 | Western et al. ......... 370/352 |
| 2011/0041041 | A1 | 2/2011 | Kim |
| 2014/0112352 | A1 | 4/2014 | Li et al. |
| 2014/0146707 | A1 | 5/2014 | Medapalli et al. |

OTHER PUBLICATIONS

Sicong Song. Self-Adaptive TCP Protocol Combined with Network Coding Scheme. ICSNC 2011, pp. 20-25.

* cited by examiner

*Primary Examiner* — Charles Appiah
*Assistant Examiner* — Margaret G Mastrodonato

(57) ABSTRACT

First data packets for a wireless device are received from a data source at a network element, and are encoded into at least one second data packet using a data redundancy factor, where the at least one second data packet comprising at least two of the first data packets. The at least one second data packet is provided to an access node and is sent from the access node to the wireless device over a first frequency band. A round trip time of at least one of the first data packets is determined at the data source, and further a frequency band load of the first frequency band is determined. A handover is performed of the wireless device from the first frequency band to a second frequency band based on the round trip time and the frequency band load of the first frequency band.

13 Claims, 6 Drawing Sheets

US 9,503,948 B1

MANAGING DATA REDUNDANCY OF WIRELESS DEVICE COMMUNICATION

TECHNICAL BACKGROUND

Data packet loss, in which a data packet intended for a receiving device fails to arrive, or arrives after a predetermined time period, can be caused by network congestion, wireless communication link interference, and a variety of other causes. To mitigate data packet loss, data packets can be repeatedly sent and re-sent, which increases packet reception at a cost of increasing network congestion. Retransmission request mechanisms can also be employed, which can also increase network congestion, owing to an increase in signaling associated with retransmission requests and subsequent packet retransmission. Further, network coding can be applied to mitigate packet loss, but the successful application of network coding is also affected by network congestion and packet loss, among other things.

Overview

In operation, first data packets for a wireless device are received from a data source at a network element, and the first data packets are encoded into at least one second data packet. The second data packet comprises at least two of the first data packets. At least one second data packet is then provided to an access node using a data redundancy factor. The data redundancy factor can be used to determine a number of the at least one second data packet encoded and sent to the access node. The at least one second data packet is then sent from the access node to the wireless device over a first frequency band. At the data source, a round trip time of the at least one of the first data packets is determined. Further, a frequency band load of the first frequency band is determined. Based on the round trip time and the frequency band load of the first frequency band, a handover can be performed of the wireless device from the first frequency band to a second frequency band of the access node. In an embodiment, based on the determined round trip time, the data redundancy factor can be adjusted, and the handover of the wireless device can be performed from the first frequency band to the second frequency band based on the round trip time, the frequency band load of the first frequency band, and the adjusted data redundancy factor.

DETAILED DESCRIPTION

Figure 1:
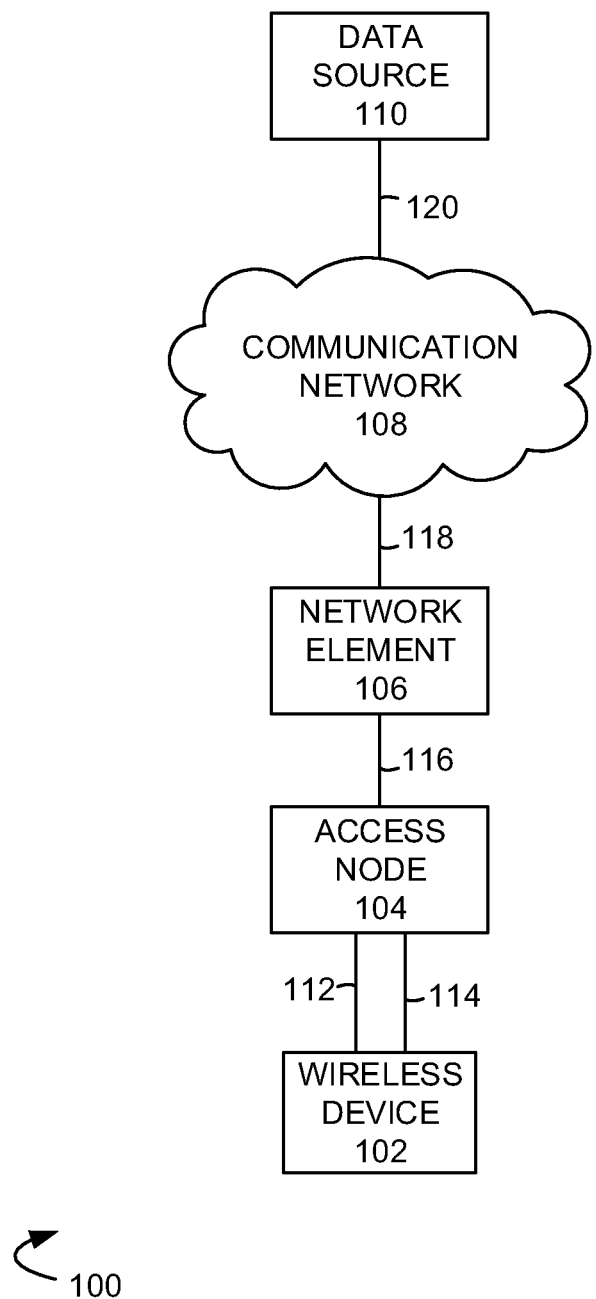
FIG. 1 illustrates an exemplary communication system to manage data redundancy of wireless device communication.

FIG. 1 illustrates an exemplary communication system 100 to manage data redundancy of wireless device communication comprising wireless device 102, access node 104, network element 106, communication network 108, and data source 110. communication network 106. Examples of wireless device 102 can comprise a cell phone, a smart phone, a computing platform such as a laptop, palmtop, or tablet, a personal digital assistant, or an internet access device, including combinations thereof. Wireless device 102 can communicate with access node 104 over communication links 112 and 114. Communication links 112 and 114 can each comprise a frequency band. While two frequency bands are illustrated in FIG. 1 for conciseness, access node 104 and wireless device 102 can also communicate over a greater number of frequency bands.

Access node 104 is a network node capable of providing wireless communications to wireless device 102, and can be, for example, a base transceiver station, a radio base station, an eNodeB device, or an enhanced eNodeB device. Access node 104 is in communication with network element 106 over communication link 116.

Network element 106 can comprise a processor and associated circuitry, and can be configured to receive first data packets for wireless device 102 and to encode the first data packets into at least one second data packet. The at least one second data packet can comprise at least two of the first data packets. Network element 106 can be further configured to provide the at least one second data packet to access node 104 using a data redundancy factor. The first data packets can be received from another network element of communication system 100, such as data source 110. Network element 106 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network element 106 can receive instructions and other input at a user interface. Examples of network element 106 can include one or more computing devices or a network components, such as an access service network gateway (ASN-GW), a packet data network gateway (P-GW), a serving gateway (S-GW), a mobile switching center (MSC), a dispatch call controller (DCC), a mobility management entity (MME), a radio network controller (RNC), a mobile switching controller (MSC), a packet data serving node (PDSN), a subscriber profile system (SPS), and an authentication, authorization, and accounting (AAA) equipment, including combinations thereof. Network element 106 is in communication network 108 over communication link 118.

Data source 110 comprises a network element of communication system 100 which can be configured to send first data packets to network element 106, e.g., in response to a request for the first data packets from wireless device 102. Data source 110 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Data source 110 can receive instructions and other input at a user interface. Examples of data source 110 can include one or more computing devices or a network components, such as a server, a router, a gateway, or another computing device. Data source 110 is in communication network 108 over communication link 120.

Communication network 108 can comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other data, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 112, 114, 116, 118 and 120 can comprise wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 104, network element 106, communication network 108, and data source 110 which are omitted for clarity, including additional processing nodes, routers, gateways, and physical and/or wireless data links for carrying data among the various network elements.

In a multiband wireless communication network, a wireless device and an access node can communicate over a variety of frequency bands. As but one example, a multiband wireless communication network can support frequency bands comprising an 800 MHz band, a 1.9 GHz band, and a 2.5 GHz band. Each frequency band can comprise different characteristics, including achievable data rates, coverage area, available and total capacity, available channel bandwidth, and the like. Data packet loss, in which a data packet intended for a receiving device fails to arrive, or fails to arrive within a predetermined time period and is declared lost, is a common issue in wireless communication systems. Such packet loss can be arise from a variety of causes, including network congestion and wireless communication link interference. To mitigate data packet loss, network coding techniques can be applied, but the successful application of network coding is affected by network congestion and packet loss, among other things.

In operation, first data packets for wireless device 102 are received from data source 110 at network element 106, and the first data packets are encoded into at least one second data packet. Each second data packet comprises at least two of the first data packets. At least one second data packet is then provided from network element 106 to access node 104 using a data redundancy factor. The data redundancy factor can be used to determine a number of the at least one second data packets encoded and sent to access node 104. The at least one second data packet is then sent from access node 104 to the wireless device over a first frequency band (e.g., communication link 112). At data source 110, a round trip time of at least one of the first data packets is determined. Further, a frequency band load of the first frequency band is determined, e.g., based on information from access node 104 and/or wireless device 102. Based on the round trip time and the frequency band load of the first frequency band, a handover can be performed of wireless device 102 from the first frequency band (e.g., communication link 112) to a second frequency band (e.g., communication link 114) of access node 104.

Figure 2:
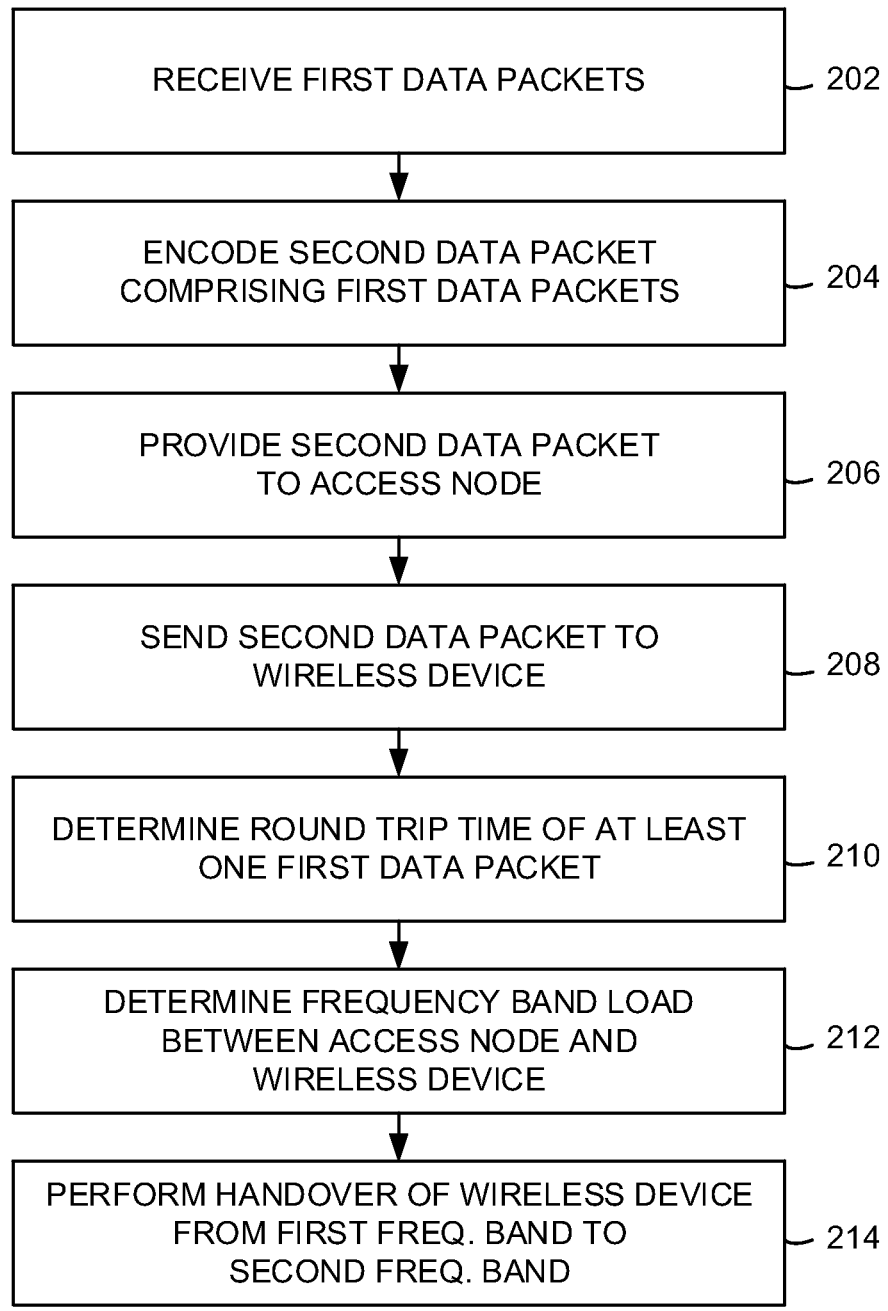
FIG. 2 illustrates an exemplary method of managing data redundancy of wireless device communication.
Figure 3:
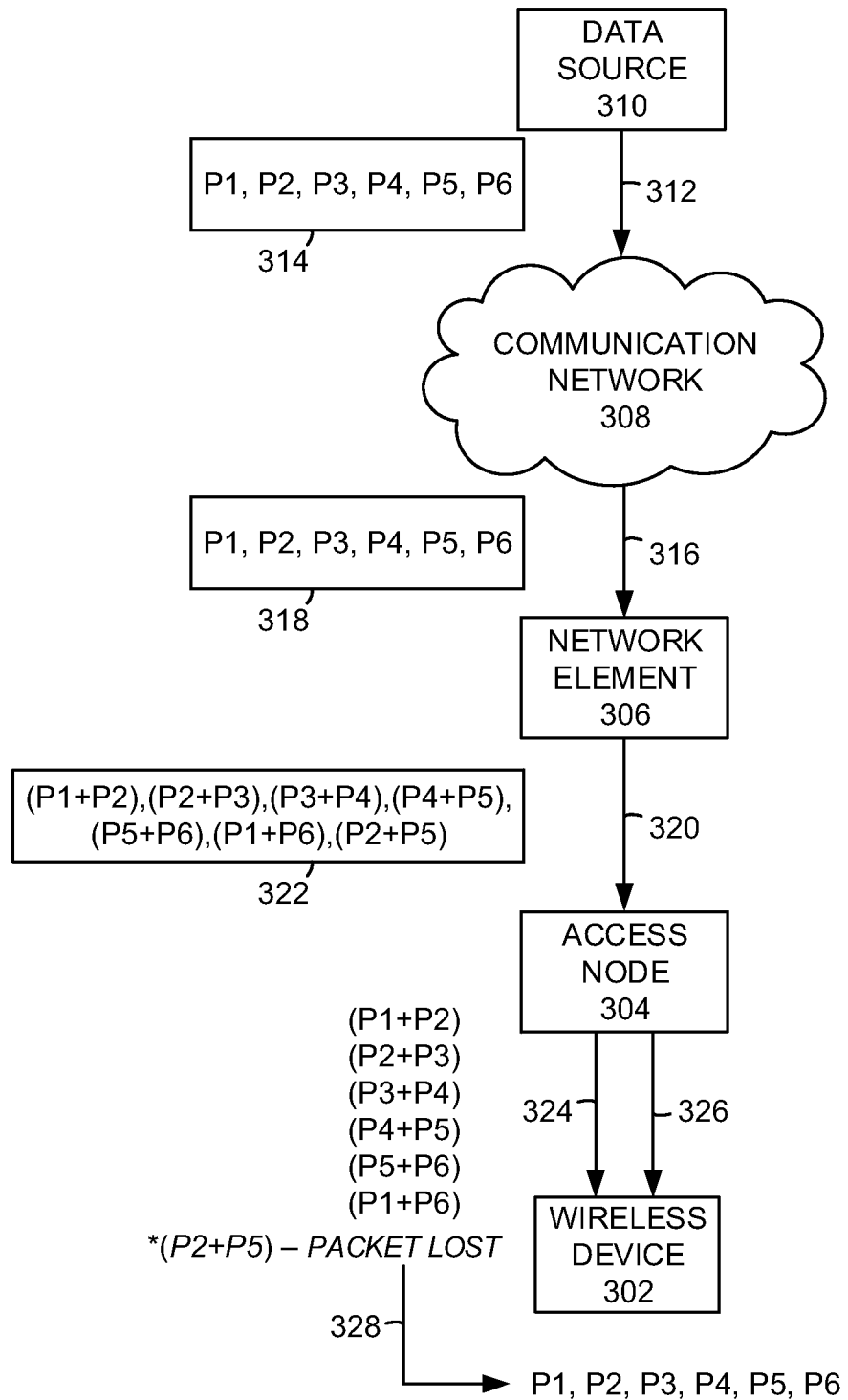
FIG. 3 illustrates an exemplary functional diagram illustrating managing data redundancy of wireless device communication.

FIG. 2 illustrates an exemplary method of managing data redundancy of wireless device communication. First data packets are received for the wireless device (operation 202), and the first data packets are encoded into at least one second data packet, each second data packet comprising at least two of the first data packets using a data redundancy factor (operation 204). For example, referring to FIG. 3, first data packets 314 comprising exemplary packets P1, P2, P3, P4, P5, and P6 (the number of which is merely exemplary and is not limiting) can be sent by data source 310 over communication link 312 to communication network 308, and can be received as first data packets 318 at network element 306 over communication link 316. The first data packets can be encoded at network element 306 into at least one second data packet, which can comprise at least two of the first data packets. For example, first data packets P1-P6 can be encoded at network element 306 into second data packets 322. Second data packets 322 comprise exemplary packets P1+P2, P2+P3, P3+P4, P4+P5, P5+P6, P1+P6, and P2+P5. In an embodiment, second data packets 322 can be encoded using linear network coding or a similar coding method. Second data packets 322 can then be provided to access node 304 over communication link 320 (operation 206).

Returning to FIG. 2, at least one second data packet is then sent from the access node to the wireless device over a first frequency band (operation 208). For example, second data packets 322 (FIG. 3) can be scheduled for delivery from access node 304 to wireless device 302 over communication link 324. At least one second data packet 322 can then be sent from access node 304 to wireless device 302 over first communication link 324. The use of second data packets to convey the information of the first data packets enhances the robustness of the communication of the first data packets to the wireless device. For example, packet P2+P5 can be lost over communication link 324. However, the information in second data packet P2+P5, namely first data packets P2 and P5, can be recovered from other second data packets when the second data packets are decoded at wireless device 302. Thus, a packet retransmission request for either of packet P2 or P5 does not need to be sent, reducing network overhead otherwise caused by retransmission requests and packet retransmission, and first packets P1-P6 can be decoded (328) from the second data packets. In operation, a threshold number of second data packets typically must be received at wireless device 302 before wireless device 302 can begin to decode the second data packets into the first data packets. The use of second data packets to convey the information of the first data packets enhances the robustness of the communication of the first data packets to the wireless device. For example, packet P2+P5 can be lost over communication link 324. However, the information in second data packet P2+P5, namely first data packets P2 and P5, can be recovered from other second data packets when the second data packets are decoded at wireless device 302. Thus, a packet retransmission request for either of packet P2 or P5 does not need to be sent, reducing network overhead otherwise caused by retransmission requests and packet retransmission.

Referring again to FIG. 2, a round trip time of at least one of the first data packets is determined (operation 210). For example, when wireless device 302 receives second data packets 322, first packets P1-P6 can be decoded (328) from the second data packets received, and for each first data packet decoded at wireless device 302, wireless device 302 can send an acknowledgement message (e.g., an ACK or similar message) to data source 310. Based on the time at which each first data packet was sent and a time of each acknowledgement message, a round trip time can be calculated for each first data packet. Even though first data packets P2 and P5 can be recovered from other second data packets when the second data packets are decoded, the loss of second data packet P2+P5 can still delay the sending of an acknowledgement message for packets P2 and P5. Thus, packet losses of the second data packets can be determined by a sender such as data source 310 based on the round trip time, because round trip time will typically increase with the loss of the second data packets. That is, when second data packet P2+P5 is lost, additional second data packets are typically required to properly decode the second data packets.

Returning to FIG. 2, next, a frequency band load of the first frequency band is determined (operation 212). The frequency band load can comprise a congestion level, an amount of data carried over the frequency band, a requested amount of data to be carried over the frequency band (as may be determined from a buffer status report or similar request for wireless communication link resources), an amount of data buffered for transmission over the frequency band, a data rate, a data throughput, a data delay, a data loss rate, a rate of retransmission requests, a level of signal interference, and the like, including combinations thereof. For example, the frequency band load of communication link 324 (FIG. 3) can be determined at wireless device 302 and/or access node 304 based on the transmission of the second data packets to wireless device 302.

Then, in operation 214 (FIG. 2), based on the round trip time and the frequency band load of the first frequency band, a handover is performed of the wireless device from the first frequency band to a second frequency band. For example, when the round trip time meets a round trip time threshold, a handover of the wireless device can be considered. Additionally, or alternatively, when the first frequency band load meets a load threshold, a handover of the wireless device can be considered. When the handover is performed, the wireless device is instructed to change from communicating with the access node over the first frequency band to communicating with the access node over the second frequency band. For example, wireless device 302 can be instructed to change from communicating with access node 304 over communication link 324 to communicating with access node 304 over communication link 326.

Figure 4:
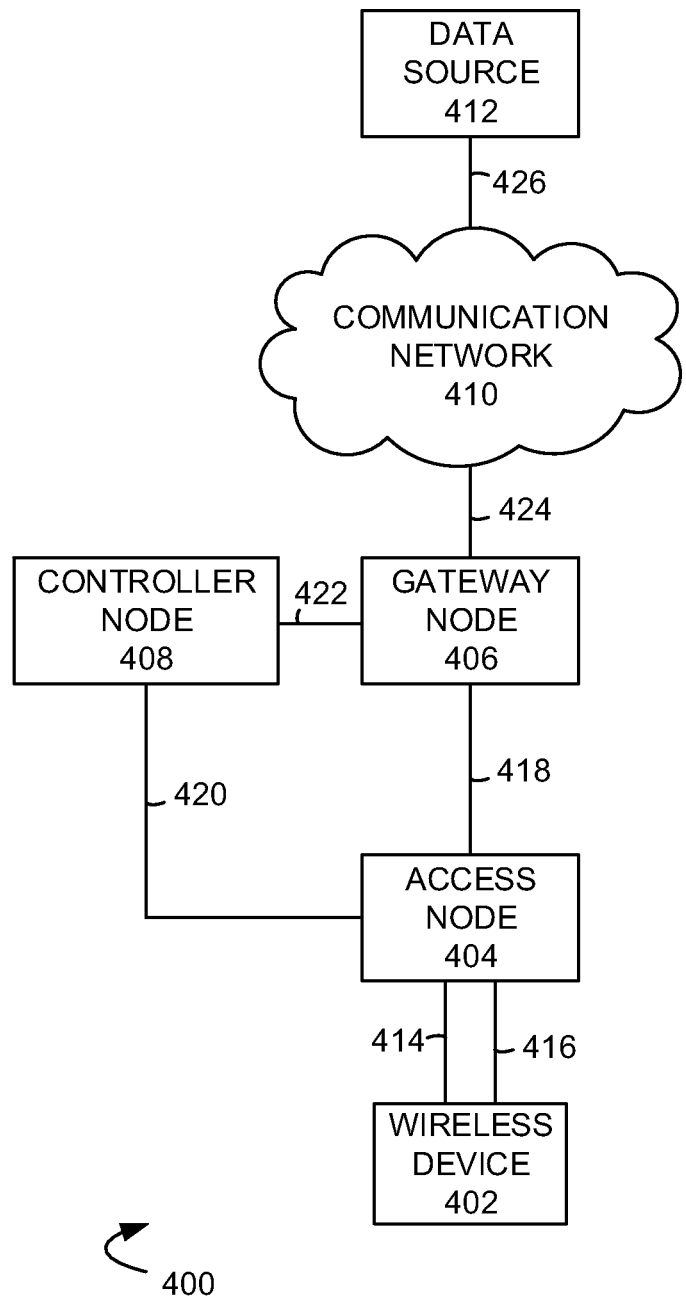
FIG. 4 illustrates another exemplary communication system to manage data redundancy of wireless device communication.

FIG. 4 illustrates another exemplary communication system 400 to manage data redundancy of wireless device communication comprising wireless device 402, access node 404, gateway node 406, controller node 408, communication network 410, and data source 412. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication links 414 and 416. Communication links 414 and 416 can each comprise a frequency band. While two frequency bands are illustrated in FIG. 4 for conciseness, access node 404 and wireless device 402 can also communicate over a greater number of frequency bands.

Access node 404 is a network node capable of providing wireless communications to wireless device 402, and can be, for example, a base transceiver station, a radio base station, an eNodeB device, or an enhanced eNodeB device. Access node 404 is in communication with gateway node 406 over communication link 418, and with controller node 408 over communication link 420.

Gateway node 406 can comprise a processor and associated circuitry to execute or direct the execution of computer-readable instructions, and can be configured to maintain network connection information associated with wireless device 402. Gateway node 406 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 406 can receive instructions and other input at a user interface. Examples of gateway node 406 can include a standalone computing device, a computer system, or a network component, such as an access service network gateway (ASN-GW), a packet data network gateway (P-GW), a serving gateway (S-GW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 406 is in communication with communication network 410 over communication link 424.

Controller node 408 can comprise a processor and associated circuitry to execute or direct the execution of computer-puter-readable instructions, and can be configured to control the setup and maintenance of a communication session over communication network 410 for wireless device 402, as well as to maintain network connection information associated with wireless device 402. Controller node 408 can comprise a mobile switching center (MSC), a dispatch call controller (DCC), a mobility management entity (MME), or other similar network node. Controller node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 is in communication with gateway node 406 over communication link 422.

Data source 412 comprises a network element of communication system 400 which can be configured to send first data packets to gateway node 406, e.g., in response to a request for the first data packets from wireless device 402. Data source 412 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Data source 412 can receive instructions and other input at a user interface, and can be configured to send first data packets to gateway node 406. Examples of data source 412 can include one or more computing devices or a network components, such as a server, a router, a gateway, or another computing device. Data source 412 is in communication network 410 over communication link 426.

Communication network 410 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 can be capable of carrying voice information and other data, for example, to support communications by a wireless device such as wireless device 402. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 410 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 410 may also comprise a wireless network, including base stations, wireless communication nodes, telephony switches, internet routers, network gateways, computer systems, communication links, or some other type of communication equipment, and combinations thereof.

Communication links 414, 416, 418, 420, 422, and 426 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 404, gateway node 406, controller node 408, communication network 410, and data source 412 which are omitted for clarity, including additional processing nodes, routers, gateways, and physical and/or wireless data links for carrying data among the various network elements.

Figure 5:
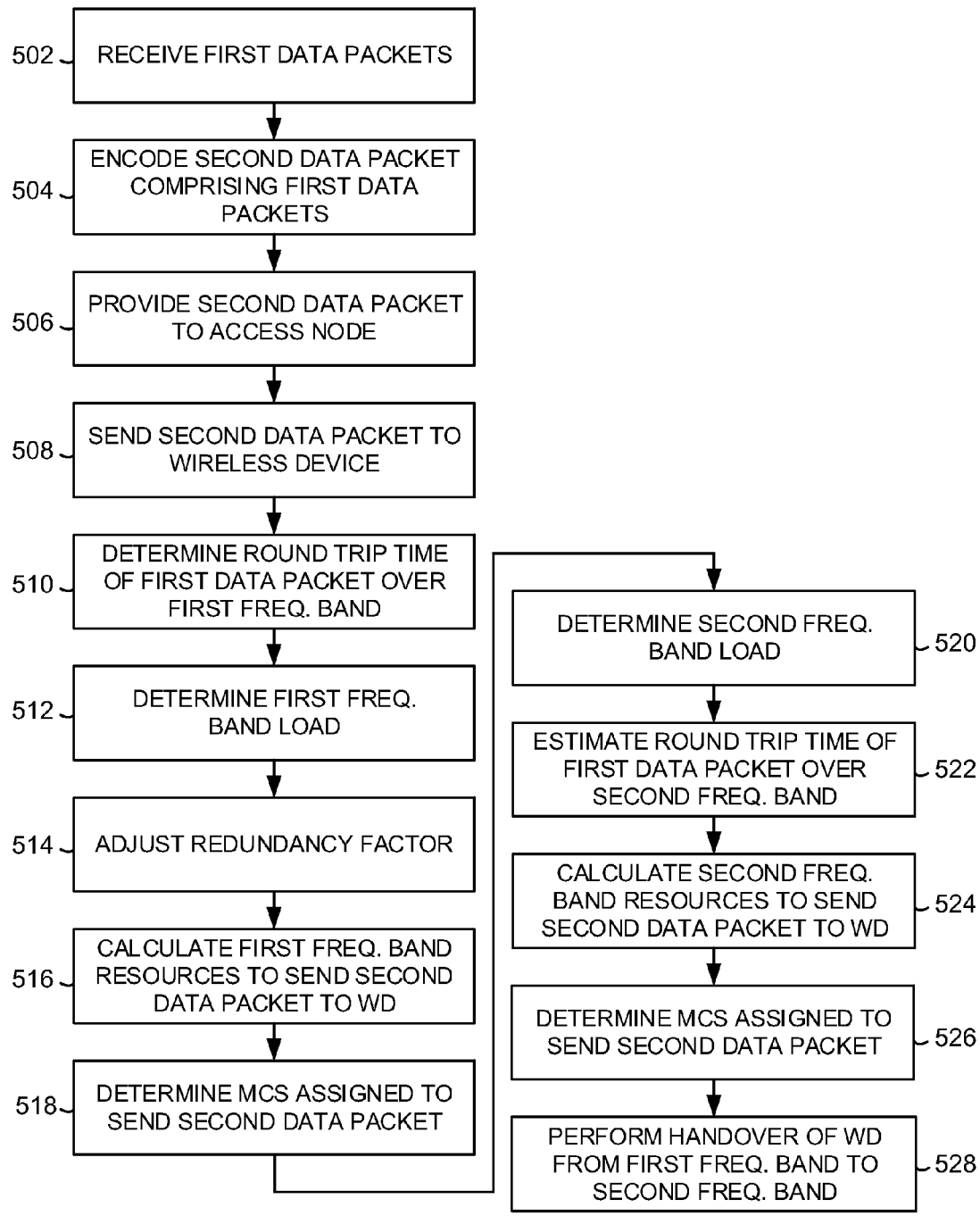
FIG. 5 illustrates another exemplary method of managing data redundancy of wireless device communication.

FIG. 5 illustrates another exemplary method of managing data redundancy of wireless device communication. First data packets are received for the wireless device (operation 502), and the first data packets are encoded into at least one second data packet, each second data packet comprising at least two of the first data packets (operation 504). For example, referring to FIG. 4, first data packets can be sent by data source 412 over communication link 426 to communication network 410, and the first data packets can be received at gateway node 406 over communication link 424. The first data packets can be encoded at gateway node 406 into at least one second data packet, which can comprise at least two of the first data packets. A number of second data packets can be encoded according to a data redundancy factor. In an embodiment, second data packets can be encoded using linear network coding or a similar coding method. The second data packets can then be provided to access node 404 over communication link 418 (operation 506).

Returning to FIG. 5, at least one second data packet is then sent from the access node to the wireless device over a first frequency band (operation 508). For example, second data packets can be scheduled for delivery to wireless device 402 (FIG. 4) over communication link 414. At least one second data packet can then be sent from access node 404 to wireless device 402 over first communication link 402. The use of second data packets to convey the information of the first data packets enhances the robustness of the communication of the first data packets to the wireless device, for example, by enabling the recovery of first data packets even when a second data packet is lost, reducing the need for a packet retransmission request and for retransmission of packets. In operation, a threshold number of second data packets typically must be received at wireless device 402 before wireless device 402 can begin to decode the second data packets into the first data packets.

Referring again to FIG. 5, a round trip time of at least one of the first data packets is determined (operation 510). For example, when wireless device 402 receives second data packets, first packets can be decoded from the second data packets received, and for each first data packet decoded at wireless device 402, wireless device 402 can send an acknowledgement message (e.g., an ACK or similar message) to data source 412. In an embodiment, the acknowledgment message comprises a transfer control protocol (TCP) acknowledgement message. Based on the time at which a first data packet was sent and a time of an acknowledgement message associated with the decoding of the first data packet, a round trip time can be calculated for the first data packet. When a second data packet is lost, additional second data packets are typically required to properly decode the second data packets. Thus, when a second data packet is lost round trip time associated with the encoded first data packets can increase. An increase in round trip time can therefore be correlated with second data packet loss.

A frequency band load of the first frequency band is also determined (operation 512). The first frequency band load can comprise a congestion level, an amount of data carried over the first frequency band, a requested amount of data to be carried over the first frequency band (as may be determined from a buffer status report or similar request for wireless communication link resources), an amount of data buffered for transmission over the first frequency band, a data rate, a data throughput, a data delay, a data loss rate, a rate of retransmission requests, a level of signal interference, and the like, including combinations thereof. The first frequency band load of communication link 414 (FIG. 4) can be determined at wireless device 402 and/or access node 404 based on the transmission of the second data packets to wireless device 402.

The data redundancy factor is then adjusted based on the determined round trip time (operation 514). The data redundancy factor can be used to determine a number of the at least one second data packet encoded and sent to the access node. Loss of a second data packet can increase the round trip time associated with a first data packet encoded into the second data packet. Thus, an increase in round trip time can therefore be correlated with second data packet loss. Based on the round trip time, the data redundancy can be adjusted. For example, as the round trip time increases, the data redundancy factor can be increased, to encode additional second data packets to be sent to access node 404 and to wireless device 402. The generation of additional second data packets can permit the decoding of first data packets from the second data packets even when some second data packets are lost. The adjusted data redundancy factor can be compared to a redundancy threshold, to provide a factor in determining whether to perform a handover of the wireless device from the first frequency band to a second frequency band. For example, a handover of the wireless device can be performed from the first frequency band to the second frequency band when the adjusted data redundancy factor meets a redundancy threshold. As another example, the handover of the wireless device from the first frequency band to the second frequency band can be performed based on the round trip time, the frequency band load of the first frequency band, and the adjusted data redundancy factor.

Next, an amount of frequency band resources required to send the at least one second data packet from the access node to the wireless device over a first frequency band is calculated based on the round trip time and the frequency band load (operation 516). The amount of frequency band resources required to send the at least one second data packet can comprise an amount of bandwidth, a number of frames, a number of sub-frames, a number of physical resource blocks, a number of time slots, an amount of data to be carried over the first frequency band, an amount of data buffered for transmission over the first frequency band, and the like, including combinations thereof. The amount of frequency band resources required can be compared to a resources criteria, to provide a factor in determining whether to perform a handover of the wireless device from the first frequency band to a second frequency band. For example, a resources criteria can be based on an application requirement associated with an application running on the wireless device. The application requirement can comprise a minimum data rate, a maximum permitted data delay, a minimum throughput, a maximum error rate, a maximum data loss rate, and the like, of an application running on a wireless device, required for the application to provide a threshold level of performance. The application requirement can also be determined based on the application type, such as whether the application is a relatively delay sensitive application (such as a streaming audio application a streaming video application, a voice application, and the like) or a relatively delay insensitive application (such as an email application, a messaging application, a web browsing application, and the like).

Additionally, or alternatively, a modulation and coding scheme (MCS) assigned to send the at least one second data packet to the wireless device is determined (operation 518). The modulation and coding scheme can comprise an indication of data carrying capacity over time, such as quadrature phase shift keying (QPSK), 16-quadrature amplitude modulation (QAM), 64QAM, and the like. The MCS can further comprise a forward error correction element, such as ½, ¾. and the like. The amount of frequency band resources required to send the at least one second data packet over the first frequency band and the MCS can provide further indications of the resource utilization impact of sending the at least one second data packet over the first frequency band.

Next, a frequency band load of the second frequency band is also determined (operation 520). The second frequency band (e.g., communication link 416, FIG. 4) can comprise a higher or lower frequency band than the first frequency band. Similar to the first frequency band load, the second frequency band load can comprise a congestion level, an amount of data carried over the second frequency band, a requested amount of data to be carried over the second frequency band (as may be determined from a buffer status report or similar request for wireless communication link resources), an amount of data buffered for transmission over the second frequency band, a data rate, a data throughput, a data delay, a data loss rate, a rate of retransmission requests, a level of signal interference, and the like, including combinations thereof. The second frequency band load of communication link 416 (FIG. 4) can be determined at wireless device 402 and/or access node 404 based on the transmission of the second data packets to another wireless device (not illustrated), based on historical data transmission and/or reception at access node 404 over the second frequency band, and the like. The second frequency band load can provide a factor in determining whether to perform a handover of the wireless device from the first frequency band to a second frequency band. For example, the handover can be performed of the wireless device from the first frequency band to a second frequency band based on the round trip time, the frequency band load of the first frequency band, and the frequency band load of the second frequency band, such as when the frequency band load of the second frequency band is less than the frequency band load of the first frequency band.

Returning to FIG. 5, a round trip time of at least one of the first data packets on the second frequency band is then estimated (operation 522). For example, based on at least the second frequency band load, a time at which a first data packet is sent to the wireless device and an estimated time at which an acknowledgement message may be received from the wireless device, a round trip time of a first data packet over the second frequency band can be estimated. Similar to the first frequency band, when a second data packet is lost, additional second data packets are typically required to properly decode the second data packets, and so an estimated round trip time over the second frequency band can therefore be correlated with an estimated second data packet loss over the second frequency band. The round trip time of the at least one of the first data packets on the second frequency band can provide a factor in determining whether to perform a handover of the wireless device from the first frequency band to a second frequency band. For example, the handover can be performed of the wireless device from the first frequency band to a second frequency band based on the round trip time, the frequency band load of the first frequency band, the frequency band load of the second frequency band, and the estimated round trip time of the at least one second data packet on the second frequency band, such as when the frequency band load of the second frequency band is less than the frequency band load of the first frequency band and/or the estimated round trip time on the second frequency band is less than the round trip time on the first frequency band.

Next, an amount of frequency band resources required to send the at least one second data packet from the access node to the wireless device over the second frequency band is calculated based on the round trip time and the frequency band load (operation 524). The amount of frequency band resources required to send the at least one second data packet can comprise an amount of bandwidth, a number of frames, a number of sub-frames, a number of physical resource blocks, a number of time slots, an amount of data to be carried over the first frequency band, an amount of data buffered for transmission over the first frequency band, and the like, including combinations thereof.

The amount of frequency band resources required to send the at least one second data packet from the access node to the wireless device over the second frequency band can provide a factor in determining whether to perform a handover of the wireless device from the first frequency band to the second frequency band. For example, the handover of the wireless device from the first frequency band to the second frequency band can be performed based on the round trip time, the frequency band load of the first frequency band, the frequency band load of the second frequency band, the estimated round trip time of the at least one second data packet on the second frequency band, and the amount of frequency band resources required to send the at least one second data packet from the access node to the wireless device over the second frequency band. In an example, the handover can be performed when the frequency band load of the second frequency band is less than the frequency band load of the first frequency band, and/or the estimated round trip time on the second frequency band is less than the round trip time on the first frequency band, and/or the amount of frequency band resources required to send the at least one second data packet from the access node to the wireless device over the second frequency band is less than the amount of frequency band resources required to send the at least one second data packet from the access node to the wireless device over the first frequency band.

Additionally, or alternatively, a modulation and coding scheme (MCS) which may be assigned to send the at least one second data packet to the wireless device over the second frequency band is determined (operation 526). The modulation and coding scheme can comprise an indication of data carrying capacity over time, such as quadrature phase shift keying (QPSK), 16-quadrature amplitude modulation (QAM), 64QAM, and the like. The MCS can further comprise a forward error correction element, such as ½, ¾. and the like. The amount of frequency band resources required to send the at least one second data packet over the first frequency band and the MCS can provide further indications of the resource utilization impact of sending the at least one second data packet over the first frequency band.

The MCS which may be assigned to send the at least one second data packet to the wireless device over the second frequency band can provide a factor in determining whether to perform a handover of the wireless device from the first frequency band to the second frequency band. For example, the handover can be performed based on the round trip time, the frequency band load of the first frequency band, a determined modulation and coding scheme assigned to send the at least one second data packet to the wireless device over the first frequency band, the estimated round trip time of the at least one second data packet on the second frequency band, the amount of frequency band resources required to send the at least one second data packet from the access node to the wireless device over the second frequency band, and the estimated modulation and coding scheme of the second frequency band assigned to send the at least one second data packet to the wireless device over the second frequency band. In an example, the handover can be performed when the handover can be performed when the frequency band load of the second frequency band is less than the frequency band load of the first frequency band, and/or the estimated round trip time on the second frequency band is less than the round trip time on the first frequency band, and/or the amount of frequency band resources required to send the at least one second data packet from the access node to the wireless device over the second frequency band is less than the amount of frequency band resources required to send the at least one second data packet from the access node to the wireless device over the first frequency band, and/or the MCS which may be assigned to send the at least one second data packet to the wireless device over the second frequency band is superior to the MCS assigned to send the at least one second data packet to the wireless device over the first frequency band.

Then, based on the round trip time and the frequency band load of the first frequency band, a handover can be performed of the wireless device from the first frequency band to a second frequency band (operation 528). For example, when the round trip time meets a round trip time threshold, a handover of the wireless device can be considered. Additionally, or alternatively, when the first frequency band load meets a load threshold, a handover of the wireless device can be considered. When the handover is performed, the wireless device is instructed to change from communicating with the access node over the first frequency band to communicating with the access node over the second frequency band. For example, wireless device 402 can be instructed to change from communicating with access node 404 over communication link 414 to communicating with access node 404 over communication link 416.

Figure 6:
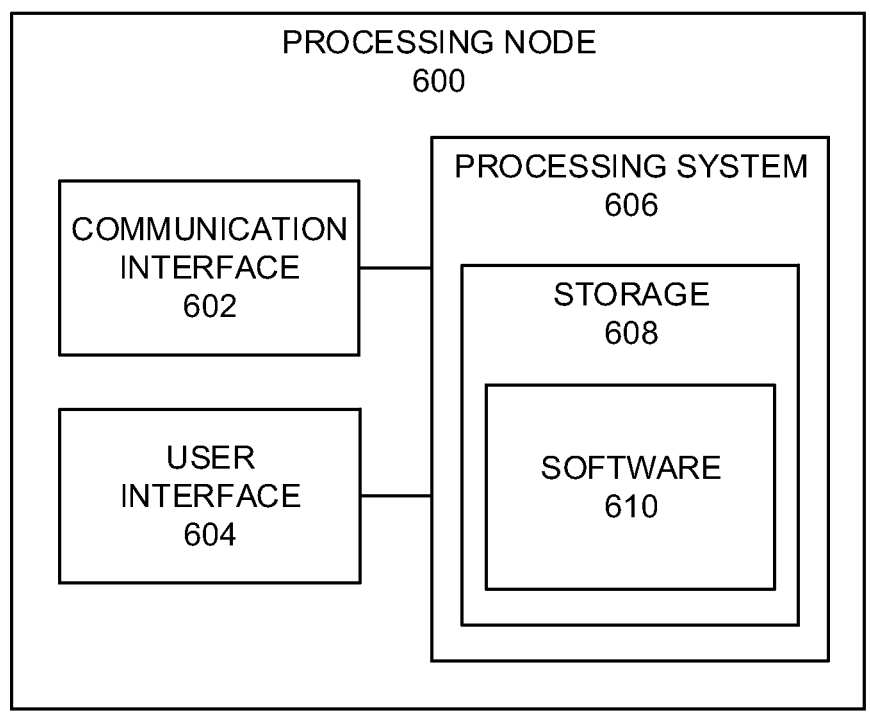
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to instruct the sending of data packets to a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, network element 106, access node 304, network element 306, access node 404, gateway node 406, and controller node 408. Processing node 600 can also be an adjunct or component of a network element, such as an element of access node 104, network element 106, access node 304, network element 306, access node 404, gateway node 406, or controller node 408. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing data redundancy of wireless device communication, comprising:
   receiving first data packets at a network element and encoding at least two first data packets into one or more second data packets based on an adjusted data redundancy factor;
   sending the one or more second data packets from an access node to a wireless device over a first frequency band and, on receipt of a threshold number of the second data packets at the wireless device, decoding the second data packets into the first data packets;
   calculating a round trip time ("RTT") for at least one of the decoded first data packets;
   based on the RTT of the at least one decoded first data packet and a load of the first frequency band, re-adjusting the data redundancy factor; and,
   performing a handover of the wireless device from the first frequency band to a second frequency band when the re-adjusted data redundancy factor meets a redundancy threshold and an estimated modulation and coding scheme ("MCS") assigned to send the one or more second data packets over the second frequency band is superior to an MCS assigned to send the one or more second data packets over the first frequency band.

2. The method of claim 1, further comprising:
   calculating an amount of frequency band resources required to send the one or more second data packets from the access node to the wireless device over the first frequency band based on the RTT of the at least one decoded first data packet and the first frequency band load; and
   performing the handover of the wireless device from the first frequency band to the second frequency band when the amount of frequency band resources required meets a resources criteria.

3. The method of claim 1, further comprising:
   determining a load of the second frequency band; and
   performing a handover of the wireless device from the first frequency band to the second frequency band based on the RTT of the at least one decoded first data packet, the frequency band load of the first frequency band, and the frequency band load of the second frequency band.

4. The method of claim 3, further comprising:
   estimating a RTT of the one or more second data packets on the second frequency band based on the determined frequency band load of the second frequency band; and
   performing a handover of the wireless device from the first frequency band to the second frequency band based on the RTT of the at least one decoded first data packet, the frequency band load of the first frequency band, the frequency band load of the second frequency band, and the estimated RTT of one or more second data packets on the second frequency band.

5. The method of claim 4, further comprising:
   calculating an amount of frequency band resources required to send the one or more second data packets from the access node to the wireless device over the second frequency band based on the determined frequency band load of the second frequency band and the estimated RTT of the one or more second data packets on the second frequency band; and
   performing the handover of the wireless device from the first frequency band to the second frequency band based on the RTT of the at least one decoded first data packet, the frequency band load of the first frequency band, the frequency band load of the second frequency band, the estimated RTT of the one or more second data packets on the second frequency band, and the amount of frequency band resources required to send the one or more second data packets from the access node to the wireless device over the second frequency band.

6. The method of claim 5, further comprising:
   estimating the MCS assigned to send the one or more second data packets to the wireless device over the second frequency band; and
   performing the handover of the wireless device from the first frequency band to the second frequency band based on the RTT of the at least one decoded first data packet, the frequency band load of the first frequency band, a determined MCS assigned to send the one or more second data packets to the wireless device over the first frequency band, the estimated RTT of the one or more second data packets on the second frequency band, the amount of frequency band resources required to send the one or more second data packets from the access node to the wireless device over the second frequency band, and the estimated MCS of the second frequency band assigned to send the one or more second data packets to the wireless device over the second frequency band.

7. A system of managing data redundancy of wireless device communication, comprising:
 a processing node configured to:
  receive first data packets at a network element and encode at least two first data packets into one or more second data packets based on an adjusted data redundancy factor;
  send the one or more second data packets from an access node to a wireless device over a first frequency band and, on receipt of a threshold number of the second data packets at the wireless device, decode the second data packets into the first data packets;
  calculate a round trip time ("RTT") for at least one of the decoded first data packets;
  based on the RTT of the at least one decoded first data packet and a load of the first frequency band, re-adjust the data redundancy factor; and,
  perform a handover of the wireless device from the first frequency band to a second frequency band when the re-adjusted data redundancy factor meets a redundancy threshold and an estimated modulation and coding scheme ("MCS") assigned to send the one or more second data packets over the second frequency band is superior to an MCS assigned to send the one or more second data packets over the first frequency band.

8. The system of claim 7, wherein the processing node is further configured to:
 calculate an amount of frequency band resources required to send the one or more second data packets from the access node to the wireless device over the first frequency band based on the RTT of the at least one decoded first data packet and the first frequency band load; and
 perform the handover of the wireless device from the first frequency band to the second frequency band when the amount of frequency band resources required meets a resources criteria.

9. The system of claim 7, wherein the processing node is further configured to:
 determine a load of the second frequency band; and
 perform a handover of the wireless device from the first frequency band to the second frequency band based on the RTT of the at least one decoded first data packet, the frequency band load of the first frequency band, and the frequency band load of the second frequency band.

10. The system of claim 9, wherein the processing node is further configured to:
 estimate a RTT of the one or more second data packets on the second frequency band based on the determined frequency band load of the second frequency band; and
 perform a handover of the wireless device from the first frequency band to a second frequency band based on the RTT of the at least one decoded first data packet, the frequency band load of the first frequency band, the frequency band load of the second frequency band, and the estimated RTT of the one or more second data packets on the second frequency band.

11. The system of claim 10, wherein the processing node is further configured to:
 calculate an amount of frequency band resources required to send the one or more second data packets from the access node to the wireless device over the second frequency band based on the determined frequency band load of the second frequency band and the estimated RTT of the one or more second data packets on the second frequency band; and
 perform the handover of the wireless device from the first frequency band to the second frequency band based on the RTT of the at least one decoded first data packet, the frequency band load of the first frequency band, the frequency band load of the second frequency band, the estimated RTT of the one or more second data packets on the second frequency band, and the amount of frequency band resources required to send the one or more second data packets from the access node to the wireless device over the second frequency band.

12. The system of claim 11, wherein the processing node is further configured to:
 estimate the MCS assigned to send the one or more second data packets to the wireless device over the second frequency band; and
 perform the handover of the wireless device from the first frequency band to the second frequency band based on the RTT of the at least one decoded first data packet, the frequency band load of the first frequency band, a determined MCS assigned to send the one or more second data packets to the wireless device over the first frequency band, the estimated RTT of the at least one second data packet on the second frequency band, the amount of frequency band resources required to send the one or more second data packets from the access node to the wireless device over the second frequency band, and the estimated MCS of the second frequency band assigned to send the one or more second data packets to the wireless device over the second frequency band.

13. A method of managing data redundancy of wireless device communication, comprising:
 receiving at least two first data packets at a network element and, based on a retransmission request associated with at least one of the two first data packets, calculating a data redundancy factor;
 encoding, based on the data redundancy factor, the at least two first data packets into at least one second data packet;
 providing, via an access node, the encoded second data to the wireless device over a first frequency band;
 decoding the at least one second data packet and calculating a RTT associated with at least one of the at least two first data packets;
 based on a correlation of the RTT and a second data packet loss, adjusting the data redundancy factor; and,
 performing a handover of the wireless device from the first frequency band to a second frequency band when the adjusted data redundancy factor meets a redundancy threshold and an estimated modulation and coding scheme ("MCS") assigned to send the at least one second data packet over the second frequency band is superior to an MCS assigned to send the at least one second data packet over the first frequency band.

\* \* \* \* \*